United States Patent [19]

Cao

[11] Patent Number: 4,948,191

[45] Date of Patent: Aug. 14, 1990

[54] PROTECTOR FOR A ROOF AND WINDOWS OF A MOTOR VEHICLE

[76] Inventor: Dac-Buu Cao, 652B W. Main St., Tustin, Calif. 92680

[21] Appl. No.: 438,242

[22] Filed: Nov. 20, 1989

[51] Int. Cl.⁵ .............................................. B60J 11/00
[52] U.S. Cl. .................................... 296/95.1; 296/136; 160/370.2
[58] Field of Search .............................. 296/95.1, 136; 160/370.2

[56] References Cited

U.S. PATENT DOCUMENTS

| | | | |
|---|---|---|---|
| 2,639,751 | 5/1953 | Flaherty | 296/95.1 |
| 2,646,097 | 7/1953 | Gaverth et al. | 296/95.1 |
| 2,907,384 | 10/1959 | Spratt et al. | 296/95.1 |
| 3,042,111 | 7/1962 | Wytovich | 296/95.1 |
| 4,795,207 | 1/1989 | Clarke | 296/136 |
| 4,850,635 | 7/1989 | Lindell | 296/136 |
| 4,863,210 | 9/1989 | Kenon | 296/136 |

*Primary Examiner*—Robert R. Song
*Attorney, Agent, or Firm*—Michael I. Kroll

[57] ABSTRACT

A protector for a roof and windows of a motor vehicle is provided and consists of a crown formed from a sheet of flexible waterproof material sized to cover the roof and windows of the motor vehicle. The crown is detachably connected in place over the roof and windows of the motor vehicle.

5 Claims, 2 Drawing Sheets

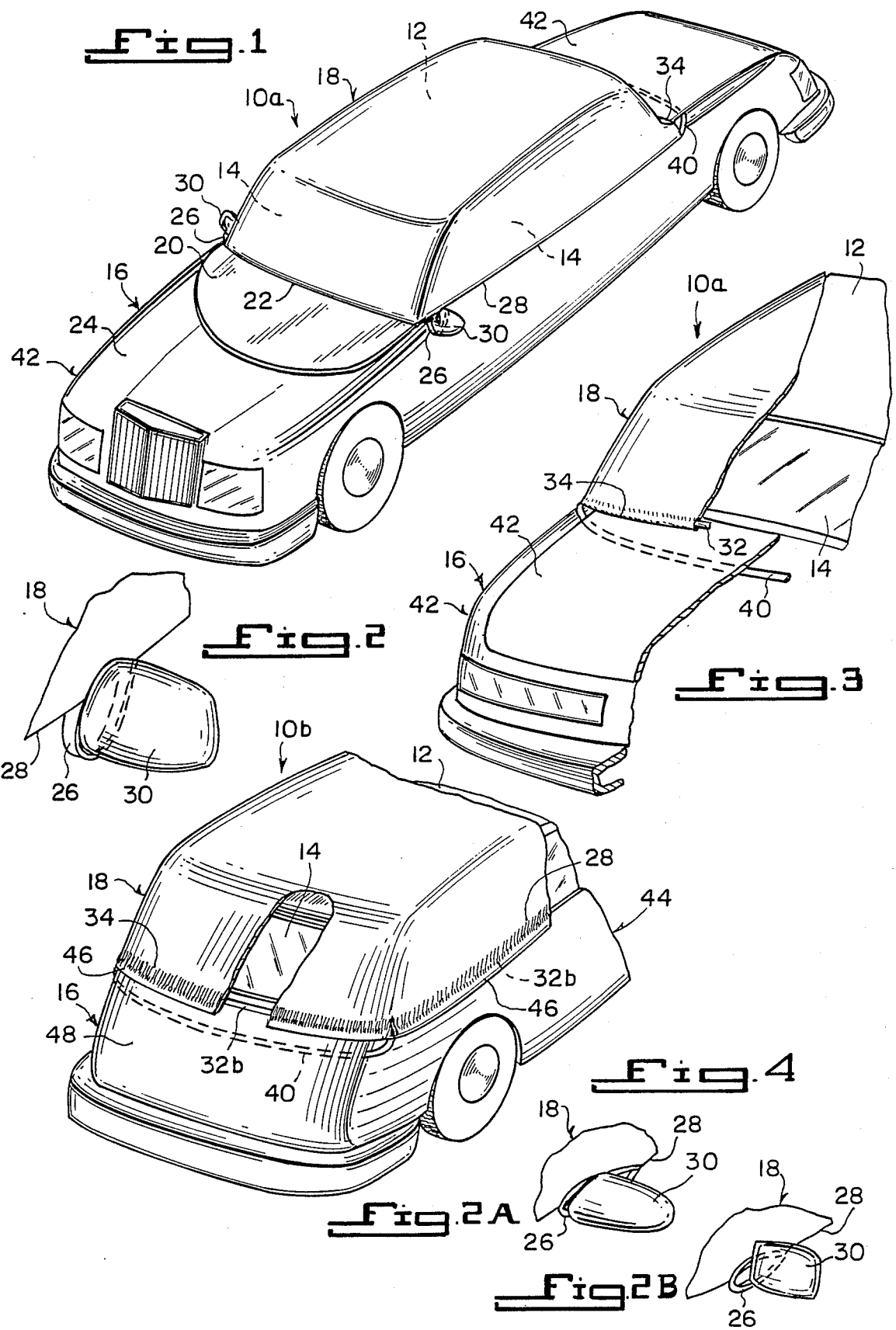

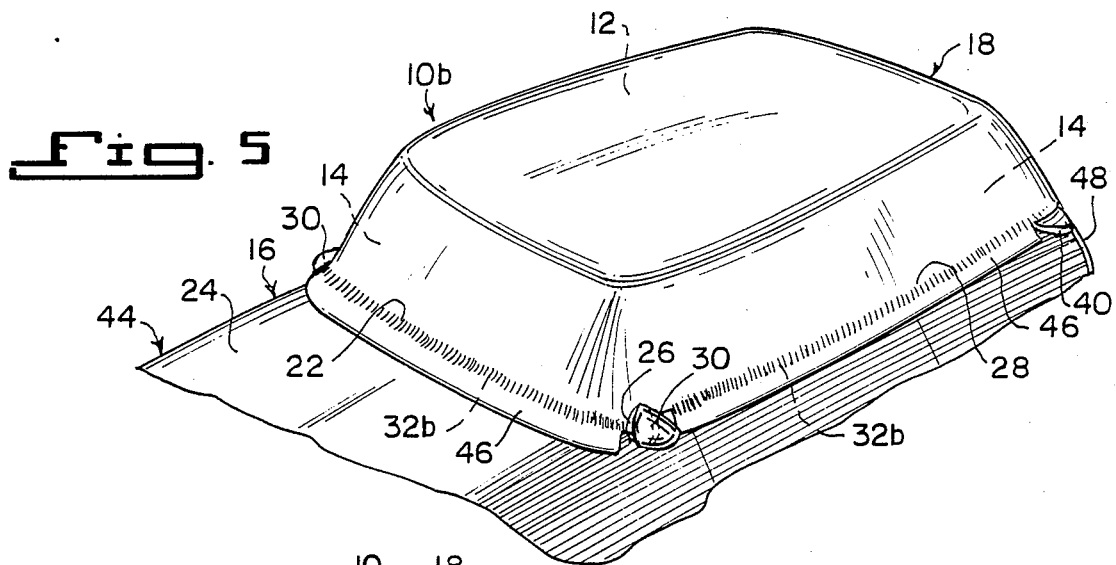
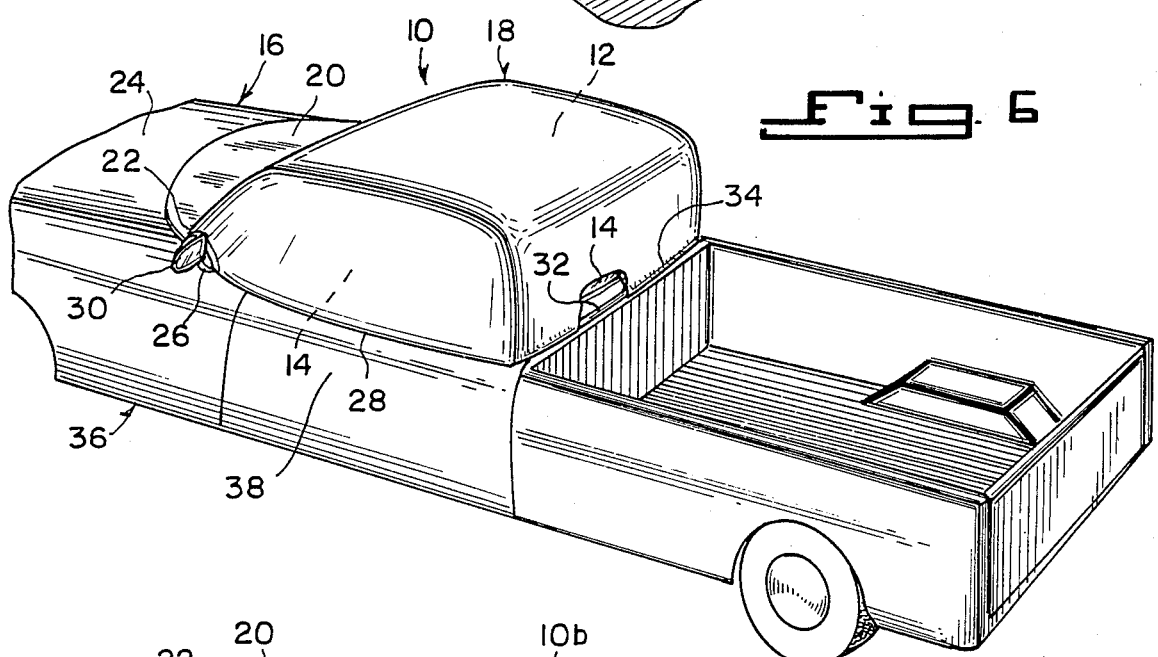
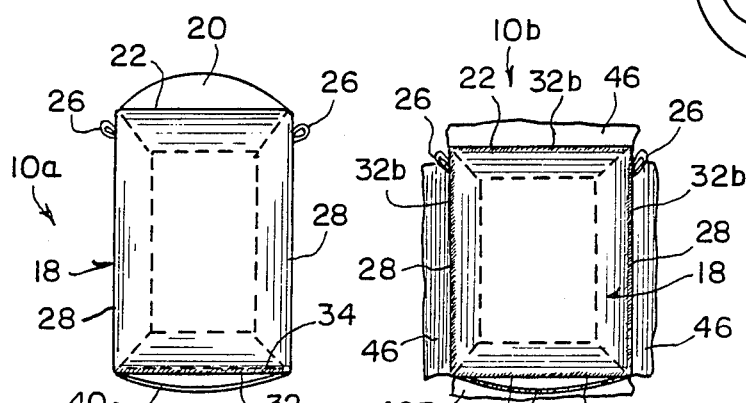
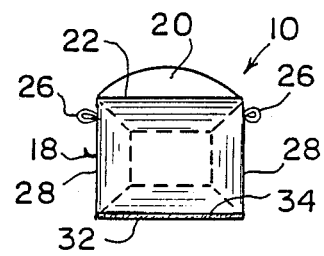

PROTECTOR FOR A ROOF AND WINDOWS OF A MOTOR VEHICLE

BACKGROUND OF THE INVENTION

1. Field of the Invention

The instant invention relates generally to vehicle covers and more specifically it relates to a protector for a roof and windows of a motor vehicle.

2. Description of the Prior Art

Numerous vehicle covers have been provided in prior art that are adapted to protect the vehicles from the elements, such as inclement weather, particularly during the winter. For example, U.S. Pat. Nos. 2,639,751 to Flaherty; 2,716,433 to Rawlings; 2,718,912 to Zimmerman; 2,787,311 to Cohen et al; 2,950,749 to MacDonald and 4,209,197 to Fischer all are illustrative of such prior art. While these units may be suitable for the particular purpose to which they address, they would not be suitable for the purposes of the present invention as heretofore described.

SUMMARY OF THE INVENTION

A primary object of the present invention is to provide a protector for a roof and windows of a motor vehicle that will overcome the shortcomings of the prior art devices.

Another objects is to provide a protector for a roof and windows of a motor vehicles that can be readily applied and removed from the motor vehicle without the use of special tools or hardware.

An additional object is to provide a protector for a roof and windows of a motor vehicle in which the side view mirrors can be utilized in securing the protector to the motor vehicle.

Another additional object is to provide a protector for a roof and windows of a motor vehicle in which the trunk lid can be utilized in securing the protector to the motor vehicle.

A further object is to provide a protector for a roof and windows of a motor vehicle that is simple and easy to use.

A still further object is to provide a protector for a roof and windows of a motor vehicle that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a front perspective view of the invention on a sedan type automobile.

FIG. 1A is a top view of the invention shown in FIG. 1.

FIG. 2 is an enlarged perspective view of an elastic loop secured to a side view mirror.

FIG. 2A is an enlarged perspective view of another elastic loop secured at a different position to the side view mirror.

FIG. 2B is an enlarged perspective view of still another elastic loop secured at still a different position to the side view mirror.

FIG. 3 is a rear perspective view of the invention on the sedan type automobile with parts broken away.

FIG. 4 is a rear perspective view of a second form of the invention on a hatchback or coupe type automobile with parts broken away.

FIG. 5 is a front perspective view of the second form of the invention on the hatchback or coupe. type automobile with parts broken away.

FIG 5A is a top view of the invention shown in FIG. 4.

FIG. 6 is a rear perspective view of a third form of the invention on a cab portion of a pick-up truck with parts broken away.

FIG. 6A is a top view of the invention shown in FIG. 6.

DETAILED DESCRIPTION OF THE PREFERRED EMBODIMENTS

Turning now descriptively to the drawings, in which similar reference characters denote similar elements throughout the several views, FIGS. 6 and 6A illustrate a protector 10 for a roof 12 and windows 14 of a motor vehicle 16. The protector 10 consists of a crown 18 formed from a sheet of flexible waterproof material, such as fabric or vinyl, sized to cover the roof 12 and windows 14 of the motor vehicle 16. A weighted front brim member 20 is affixed to the front edge 22 of the crown 18 to serve as a decorative piece on the hood 24 of the motor vehicle 16 and as a front anchor to keep the front part of the crown 18 in place over the roof 12 and windows 14 of the motor vehicle 16.

A pair of elastic loops 26 are provided. Each loop 26 is affixed to one side edge 28 of the crown 18 near the front brim member 20 to be hooked onto one side view mirror 30 of the motor vehicle 16 to serve as an auxiliary front anchor to keep front part of the crown 18 in place over the roof 12 and windows 14 of the motor vehicle 16. (See FIGS. 2, 2A and 2B). An elastic band 32 is affixed to the rear edge 34 of the crown 18 to serve as rear anchor to keep the rear part of the crown 18 in place over the roof 12 and windows 14 of the motor vehicle 12.

The crown 18 is in a generally square shaped configuration and the motor vehicle 16 is a truck 36 having a cab portion 38 with the roof 12 and windows 14 on the cab portion 38 of the truck 36 so that the crown 18 can over and be secured about the roof 12 and 10 windows of the cab portion 38 of the truck 36.

FIGS. 1, 1A and 3 show a first modified protector 10a that is similar to the protector 10 except that it further includes an elastic belt 48 having each end affixed to the rear edge 34 of the crown 18. The elastic belt 40 fits under an upper portion of a trunk lid 42 of the motor vehicle 16 after closing the trunk lid 42, to serve as an auxiliary rear anchor to keep the rear part of the crown 18 in place over the roof 12a and windows 14 of the motor vehicle 16. The crown 18 is in a generally rectangular shaped configuration and the motor vehicle is a sedan type automobile 42.

FIGS. 4, 5 and 5A show a second modified protector 10b for a roof 12 and windows 14 of a motor vehicle 16 being a hatchback type automobile 44. The protector 10b consists of a crown 18 formed from a sheet of flexible waterproof material sized to cover the roof 12 and windows of the motor vehicle 16. An elastic band 32b is affixed about all the edges 22, 28 and 34 of the crown 18 to serve as an anchor to keep the crown 18 in place over the roof 12 and windows 14 of the motor vehicle 16. Four brim members 46 are provided. Each brim member 46 extends from one of the edges 22, 28 and 34 of the crown 18. A pair of elastic loops 26 are also provided. Each loop 26 is affixed to one side edge 28 of the crown 18 near the front brim member 46 to be hooked onto one side view mirror 30 of the motor vehicle 16 to serve as an auxiliarly front anchor to keep the front part of the crown 18 in place over the roof 12 and windows 14 of the motor vehicle 16. An elastic belt 40, having each end affixed to the rear edge 34 of the crown 18, fits behind the rear door 48 of the hatchback type automobile 44 after closing the rear door 48, to serve as an auxiliary rear anchor to keep the rear part of the crown 18 in place over the roof 12 and windows 14 of the motor vehicle 16.

Any type of material could be used to manufacture the protector, including certain types of synthetics. The protector could be mass-produced for each type of vehicle (i.e., sedan, hatchback, truck) with standard size (small, medium, large), or it could be customized for each make and model of vehicle.

LIST OF REFERENCE NUMBERS 10 protector
10A first modified protector
10B second modified protector
12 roof
14 window
16 motor vehicle
18 crown
20 weighted front brim member
22 front edge of 18
24 hood of 16
26 elastic loop
28 side edge of 18
30 side view mirror of 16
32 elastic band
32B elastic band of 10b
34 rear edge of 18
36 truck
38 cab portion of 36
40 elastic belt
42 sedan type automobile
44 hatchback type automobile
46 brim member
48 rear door of 44

It will be understood that each of the elements described above, or two or more together may also find a useful application in other types of methods differing from the type described above.

It will also be understood that four-brim type and the weighted-front-brim type of protectors are interchangeable between types of vehiclies, i.e., a hatchback vehicle can have a front-brim protector and a truck or a sedan vehicle can have a four-brim protector.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A protector for a roof and windows of a motor vehicle, said protector comprising:
   (a) a crown formed from a sheet of flexible waterproof material sized to cover the roof and windows of the motor vehicle;
   (b) a weighted front brim member affixed to the front edge of said crown to serve as a decorative piece on the hood of the motor vehicle and as a front anchor to keep the front part of said crown in place over the roof and windows of the motor vehicle;
   (c) a pair of elastic loops, each affixed to one side edge of said crown near said front brim member to be hooked onto one side view mirror of the motor vehicle to serve as an auxiliary front anchor to keep the front part of said crown in place over the roof and windows of the motor vehicle;
   (d) an elastic band affixed to the rear edge of said crown to serve as a rear anchor to keep the rear part of said crown in place over the roof and windows of the motor vehicle.

2. A protector as recited in claim 1, wherein said crown is in a genrally square shaped configuration and the motor vehicle is a truck having a cab portion with the roof and windows on the cab portion of the truck so that said crown can cover and be secured about the roof and windows of the cab portion of the truck.

3. A protector as recited in claim 1, further including an elastic belt having each end affixed to the rear edge of said crown, said elastic belt fits under an upper portion of a trunk lid of the motor vehicle after closing the trunk lid to serve as an auxiliary rear anchor to keep the rear part of said crown in place over the roof and windows of the motor vehicle.

4. A protector as recited in claim 3, wherein said crown is in a generally rectangular shaped configuration and the motor vehicle is a sedan type automobile so that said crown can cover and be secured about the roof and windows of the sedan type automobile.

5. A protector for a roof and windows of a motor vehicle being a hatchback type automobile, said protector comprising:
   (a) a crown formed from a sheet of flexible waterproof material sized to cover tha roof and windows of the motor vehicle;
   (b) an elastic hand affixed about all the edges of said crown to serve as an anchor to keep said crown in place over the roof and windows of the motor vehicle;
   (c) four brim members, each extending from one of the edges of said crown;
   (d) a pair of elastic loops, each affixed to one side edge of said crown near said front brim member to be hooked onto one side view mirror of the motor vehicle to serve as an auxiliary front anchor to keep the front part of said crown in place over the roof and windows of the motor vehicle; and
   (e) an elastic belt having each end affixed to the rear edge of said crown, said elastic belt fits behind the rear door of the hatchback type automobile after closing the rear door, to serve as an auxiliary rear anchor to keep the rear part of said crown in place over the roof and windows of the motor vehicle.

* * * * *